United States Patent
Cheng

(10) Patent No.: US 12,086,968 B2
(45) Date of Patent: Sep. 10, 2024

(54) SYSTEMS AND METHODS FOR IMAGE PROCESSING

(71) Applicant: ZHEJIANG DAHUA TECHNOLOGY CO., LTD., Zhejiang (CN)

(72) Inventor: Min Cheng, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 629 days.

(21) Appl. No.: 17/321,515

(22) Filed: May 17, 2021

(65) Prior Publication Data

US 2021/0272252 A1    Sep. 2, 2021

Related U.S. Application Data

(63) Continuation of application No. PCT/CN2019/107531, filed on Sep. 24, 2019.

(30) Foreign Application Priority Data

Nov. 21, 2018   (CN) .......................... 201811390921.8

(51) Int. Cl.
   *G06T 5/92*    (2024.01)
   *G06T 5/20*    (2006.01)
   (Continued)

(52) U.S. Cl.
   CPC .................. *G06T 5/92* (2024.01); *G06T 5/20* (2013.01); *G06T 5/40* (2013.01); *G06T 5/70* (2024.01)

(58) Field of Classification Search
   CPC .... G06T 5/92; G06T 5/20; G06T 5/40; G06T 5/70; G06T 5/90; G06T 2207/10024;
   (Continued)

(56) References Cited

U.S. PATENT DOCUMENTS 6,788,819 B1   9/2004   Swann et al.
8,494,265 B2 *   7/2013   Katoh ...................... H04N 1/60
                                                        382/167

(Continued)

FOREIGN PATENT DOCUMENTS

CN   102129675 A   7/2011
CN   103167245 A   6/2013
(Continued)

OTHER PUBLICATIONS

International Search Report in PCT/CN2019/107531 mailed on Dec. 26, 2019, 5 pages.

(Continued)

*Primary Examiner* — Michael S Osinski
(74) *Attorney, Agent, or Firm* — METIS IP LLC

(57) ABSTRACT

The present disclosure is related to systems and methods for image processing. The method includes obtaining an image including a plurality of pixels. The method includes determining at least one brightness parameter based on the brightness values of the plurality of pixels. The method includes obtaining an image processing algorithm including at least one image processing parameter. The method includes determining a value of the at least one image processing parameter based on the at least one brightness parameter. The method includes generating a target image by processing the image according to the image processing algorithm upon the value of the at least one image processing parameter.

14 Claims, 8 Drawing Sheets

(51) Int. Cl.
*G06T 5/40* (2006.01)
*G06T 5/70* (2024.01)

(58) Field of Classification Search
CPC . G06T 2207/10048; G06T 2207/20004; G06T 2207/20016; G06T 2207/30168
See application file for complete search history.

(56) References Cited

U.S. PATENT DOCUMENTS

| | | | | |
|---|---|---|---|---|
| 9,418,410 | B2* | 8/2016 | Kim | G06T 5/94 |
| 10,062,154 | B1* | 8/2018 | Liu | G06T 5/92 |
| 10,582,087 | B2* | 3/2020 | Ogawa | H04N 1/4074 |
| 11,146,738 | B2* | 10/2021 | Kagawa | G06T 5/50 |
| 2008/0101697 | A1* | 5/2008 | Cho | G06T 5/92 |
| | | | | 382/169 |
| 2009/0116043 | A1 | 5/2009 | Nakajima et al. | |
| 2012/0114266 | A1* | 5/2012 | Lai | G06T 5/40 |
| | | | | 382/274 |
| 2014/0064613 | A1* | 3/2014 | Wu | G06T 5/70 |
| | | | | 382/167 |
| 2014/0079319 | A1* | 3/2014 | Lin | G06T 5/40 |
| | | | | 382/167 |
| 2016/0219230 | A1* | 7/2016 | Kono | H04N 25/616 |
| 2017/0262974 | A1 | 9/2017 | Kasahara | |
| 2017/0345187 | A1* | 11/2017 | Sato | H04N 23/72 |
| 2018/0040105 | A1* | 2/2018 | Li | G06T 5/70 |
| 2020/0021822 | A1* | 1/2020 | An | G06T 5/20 |
| 2020/0193890 | A1* | 6/2020 | Tichelaar | G09G 3/2003 |
| 2020/0286208 | A1* | 9/2020 | Halupka | G06N 3/045 |
| 2021/0295480 | A1* | 9/2021 | Yang | G06T 5/90 |
| 2021/0350513 | A1* | 11/2021 | Takahashi | G06N 20/00 |

FOREIGN PATENT DOCUMENTS

| | | | |
|---|---|---|---|
| CN | 103325098 | A | 9/2013 |
| CN | 104252695 | A | 12/2014 |
| CN | 102693531 | B | 4/2015 |
| CN | 104574280 | A | 4/2015 |
| CN | 104574281 | A | 4/2015 |
| CN | 102819833 | B | 6/2015 |
| CN | 104732487 | A | 6/2015 |
| CN | 105427255 | A | 3/2016 |
| CN | 103440630 | B | 7/2016 |
| CN | 103353349 | B | 8/2016 |
| CN | 106127704 | A | 11/2016 |
| CN | 106204505 | A | 12/2016 |
| CN | 106448524 | A | 2/2017 |
| CN | 106558028 | A | 4/2017 |
| CN | 103745433 | B | 5/2017 |
| CN | 104252700 | B | 6/2017 |
| CN | 104408695 | B | 6/2017 |
| CN | 106897972 | A | 6/2017 |
| CN | 107301635 | A | 10/2017 |
| CN | 107492081 | A | 12/2017 |
| CN | 104217399 | B | 3/2018 |
| CN | 107784637 | A | 3/2018 |
| CN | 105741245 | B | 6/2018 |
| CN | 109584175 | A | 4/2019 |
| EP | 2293247 | A1 | 3/2011 |
| JP | 2007318320 | A | 12/2007 |

OTHER PUBLICATIONS

Written Opinion in PCT/CN2019/107531 mailed on Dec. 26, 2019, 6 pages.
First Office Action in Chinese Application No. 201811390921.8 mailed on Apr. 8, 2020, 14 pages.
Xian, Yong et al., Intelligent Recognition of the Mixed Grains Composition Base on Image Processing, Optics & Optoelectronic Technology, 2014, 5 pages.
Partial Supplementary European Search Report in European Application No. 19887708.6 mailed on Dec. 1, 2021, 13 pages.
Juan Pablo Balarini et al., A C++ Implementation of Otsu's Image Segmentation Method, Image Processing on Line, 6: 155-165, 2016.
The Extended European Search Report in European Application No. 19887708.6 mailed on Mar. 4, 2022, 14 pages.

* cited by examiner

600

- 610: Determining a low frequency image by performing a low-pass filtering processing on an image based on a low pass filter parameter
- 620: Determining a high frequency image by subtracting a brightness value of each second pixel of a plurality of second pixels in the low frequency image from the brightness value of each pixel of a plurality of pixels in the image
- 630: Determining a second image by performing an automatic gain processing on the low frequency image based on an automatic gain control parameter
- 640: Determining a third image by performing a histogram equalization processing on the low frequency image
- 650: Determining a fourth image by performing a high frequency enhancement processing on the high frequency image based on a high frequency enhancement parameter
- 660: Determining a fifth image by performing a weighted summation operation on the second image and the third image based on a first weight of the histogram equalization processing and a second weight of an automatic gain control processing
- 670: Determining a target image based on the fourth image and the fifth image

FIG. 6

SYSTEMS AND METHODS FOR IMAGE PROCESSING

CROSS-REFERENCE TO RELATED APPLICATIONS

This application is a continuation of International Application No. PCT/CN2019/107531 field on Sep. 24, 2019, which claims priority of Chinese Patent Application No. 201811390921.8, filed on Nov. 21, 2018, the contents of each of which are incorporated herein by reference.

TECHNICAL FIELD

This present disclosure generally relates to systems and methods for image processing, and in particular, to systems and methods for processing an image based on a scene associated with the image.

BACKGROUND

Image processing technology is widely used in our daily life. An original image captured by an image capture device (e.g., an infrared camera) usually needs to be processed before it is sent to a terminal device for display. For example, the bit width of an original image may be in the range of 12 bits~14 bits. The terminal device may be capable of displaying an image having the bit width of 8 bits. In order to display the original image on the terminal device, the original image may need to be compressed to convert its bit width to 8 bits.

Existing techniques for compressing image data generally include an automatic gain control technique, a platform histogram equalization technique, or the like. In some embodiments, different images associated with different scenes may be processed using a same set of image processing parameters in these existing techniques, which may result in a poor processing quality. Thus, it is desirable to provide systems and methods to process an image dynamically based on the scene associated with the image to improve the quality of the processed image.

SUMMARY

According to an aspect of the present disclosure, a method may include one or more of the following operations performed by at least one processor. The method may include obtaining an image including a plurality of pixels. Each of the plurality of pixels may have a brightness value. The method may include determining at least one brightness parameter based on the brightness values of the plurality of pixels. The method may include obtaining an image processing algorithm including at least one image processing parameter. The method may include determining a value of the at least one image processing parameter based on the at least one brightness parameter. The method may include generating a target image by processing the image according to the image processing algorithm upon the value of the at least one image processing parameter.

In some embodiments, the at least one brightness parameter may include at least one of a brightness difference between a maximum brightness value and a minimum brightness value among the brightness values of the plurality of pixels, or a variance of the brightness values of the plurality of pixels.

In some embodiments, the method may also include determining the value of the at least one image processing parameter based on at least one of a preset relationship between the brightness difference and the at least one image processing parameter, or a preset relationship between the variance of the brightness values and the at least one image processing parameter.

In some embodiments, the at least one image processing parameter may include at least one of an image enhancement parameter or an image denoising parameter.

In some embodiments, the image enhancement parameter may include at least one of an automatic gain control parameter, a low pass filter parameter, a high frequency enhancement parameter, a first weight of a histogram equalization processing, or a second weight of an automatic gain control processing.

In some embodiments, a sum of the first weight of the histogram equalization processing and the second weight of the automatic gain control processing may be 1.

In some embodiments, the method may also include generating the target image by processing the image based on the at least one image processing parameter according to a hierarchical processing algorithm.

In some embodiments, the method may also include determining a low frequency image by performing a low-pass filtering processing on the image based on a low pass filter parameter. The method may also include determining a high frequency image by subtracting a brightness value of each second pixel of a plurality of second pixels in the low frequency image from the brightness value of the each pixel of the plurality of pixels in the image.

In some embodiments, the method may also include determining a second image by performing an automatic gain processing on the low frequency image based on an automatic gain control parameter. The method may also include determining a third image by performing a histogram equalization processing on the low frequency image. The method may also include determining a fourth image by performing a high frequency enhancement processing on the high frequency image based on a high frequency enhancement parameter. The method may also include determining a fifth image by performing a weighted summation operation on the second image and the third image based on a first weight of the histogram equalization processing and a second weight of an automatic gain control processing. The method may also include determining the target image by performing a summation operation on the fourth image and the fifth image.

In some embodiments, the method may also include determining a ranking of the plurality of pixels based on the brightness values of the plurality of pixels in the image. The method may also include deleting a portion of pixels from the plurality of pixels based on the ranking of the plurality of pixels.

In some embodiments, the method may also include determining a scene associated with the image based on the at least one brightness parameter.

In some embodiments, the scene associated with the image may include at least one of a low dynamic scene, a uniform scene with a high temperature object, a scene with a small temperature difference, or a high dynamic scene.

According to another aspect of the present disclosure, a system for image processing may include at least one storage medium storing a set of instructions, at least one processor in communication with the at least one storage medium. When executing the stored set of instructions, the at least one processor may cause the system to obtain an image including a plurality of pixels. Each of the plurality of pixels may have a brightness value. The at least one processor may also cause the system to determine at least one brightness parameter based on the brightness values of the plurality of pixels. The at least one processor may also cause the system to obtain an image processing algorithm including at least one image processing parameter. The at least one processor may also cause the system to determine a value of the at least one image processing parameter based on the at least one brightness parameter. The at least one processor may also cause the system to generate a target image by processing the image according to the image processing algorithm upon the value of the at least one image processing parameter.

According to still another aspect of the present disclosure, a system for image processing may include an obtaining module, a first determination module, a second determination module, and a processing module. The obtaining module may be configured to obtain an image including a plurality of pixels. Each of the plurality of pixels may have a brightness value. The obtaining module may be configured to obtain an image processing algorithm including at least one image processing parameter. The first determination module may be configured to determine at least one brightness parameter based on the brightness values of the plurality of pixels. The second determination module may be configured to determine a value of the at least one image processing parameter based on the at least one brightness parameter. The processing module may be configured to generate a target image by processing the image according to the image processing algorithm upon the value of the at least one image processing parameter.

According to still another aspect of the present disclosure, a non-transitory computer readable medium storing instructions, the instructions, when executed by at least one processor, causing the at least one processor to implement a method. The method may include obtaining an image including a plurality of pixels. Each of the plurality of pixels may have a brightness value. The method may include determining at least one brightness parameter based on the brightness values of the plurality of pixels. The method may include obtaining an image processing algorithm including at least one image processing parameter. The method may include determining a value of the at least one image processing parameter based on the at least one brightness parameter. The method may include generating a target image by processing the image according to the image processing algorithm upon the value of the at least one image processing parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for generating a target image according to some embodiments of the present disclosure;

DETAILED DESCRIPTION

Figure 1:
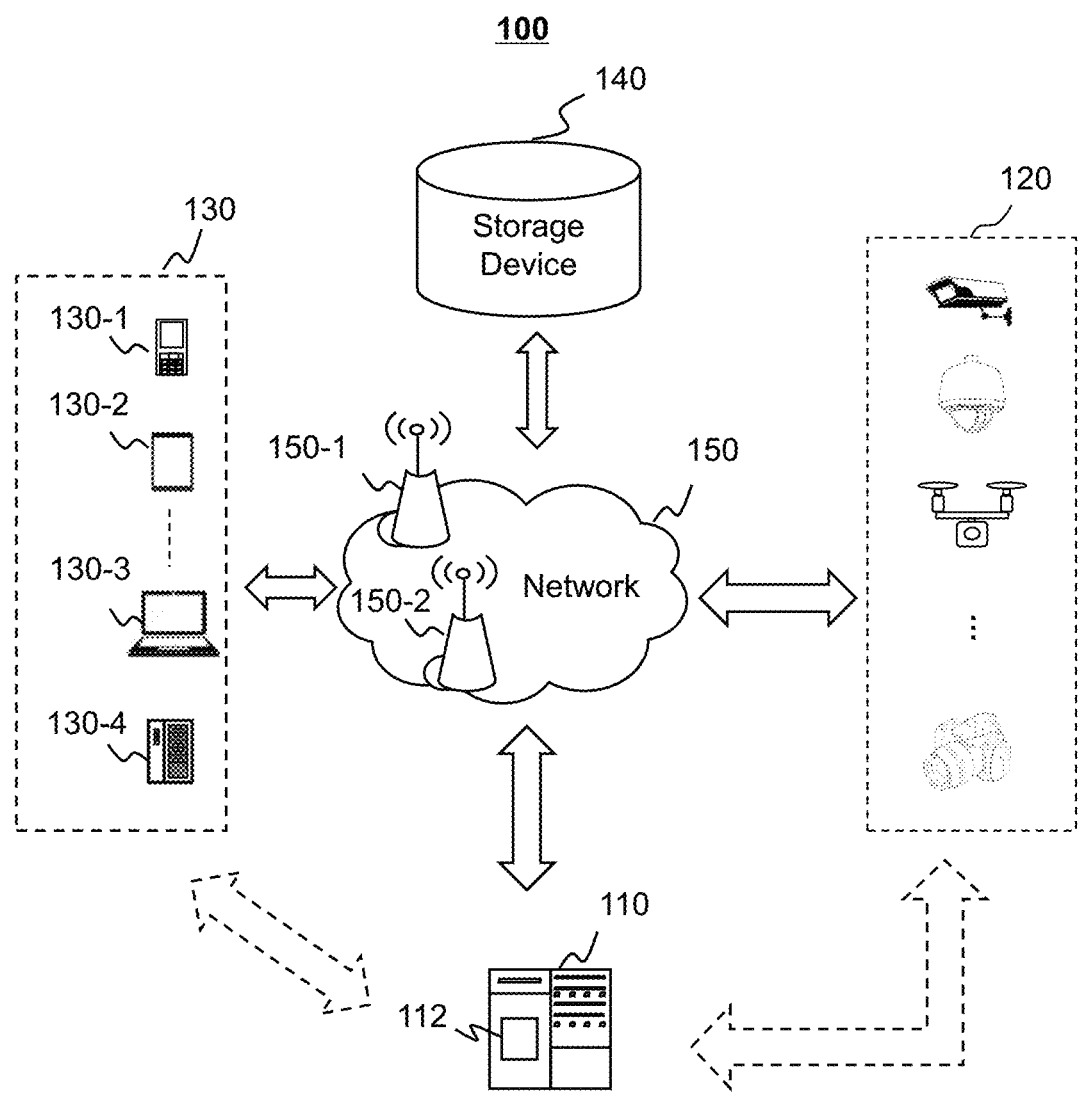
FIG. 1 is a schematic diagram illustrating an exemplary image processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for image processing. According to some embodiments of the present disclosure, an image may be obtained. The image may include a plurality of pixels. Each of the plurality of pixels may have a brightness value. At least one brightness parameter (e.g., a brightness difference, a variance of brightness values) may be determined based on the brightness values of the plurality of pixels. In some embodiments, an image processing algorithm including at least one image processing parameter may be obtained. A value of the at least one image processing parameter may be determined based on the at least one brightness parameter. For example, a scene associated with the image may be determined based on the at least one brightness parameter. The value of the at least one image processing parameter may be determined based on the scene associated with the image. A target image may be generated by processing the image according to the image processing algorithm upon the value of the at least one image processing parameter. Accordingly, different values of the at least one image processing parameter may be determined based on different scenes associated with different images. Therefore, the image may be processed based on the scene associated with the image, which may improve the quality of the processed image.

FIG. 1 is a schematic diagram illustrating an exemplary image processing system 100 according to some embodiments of the present disclosure. In some embodiments, the image processing system 100 may include a server 110, an image acquisition device 120, a terminal device 130, a storage device 140, and a network 150. The components of the image processing system 100 may be connected to each other in one or more of various ways. Merely by way of example, the acquisition device 120 may be connected to the server 110 directly or via the network 150. As another example, the storage device 140 may be connected to the server 110 directly or via the network 150. As a further example, the terminal device 130 may be connected to the server 110 directly or via the network 150.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the terminal device 130, the storage device 140, and/or the image acquisition device 120 via the network 150. As another example, the server 110 may be directly connected to the image acquisition device 120, the terminal device 130, and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure. In some embodiments, the server 110 may be integrated into the terminal device 130. In some embodiments, the server 110 may be integrated into the image acquisition device 120.

In some embodiments, the server 110 may include a processing engine 112. The processing engine 112 may process information and/or data to perform one or more functions described in the present disclosure. For example, the processing engine 112 may determine at least one brightness parameter based on brightness values of a plurality of pixels in an image. As another example, the processing engine 112 may determine a value of at least one image processing parameter based on at least one brightness parameter. As still another example, the processing engine 112 may generate a target image by processing an image according to an image processing algorithm upon a value of at least one image processing parameter. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 150 to communicate with one or more components (e.g., the terminal device 130, the storage device 140, and/or the image acquisition device 120) of the image processing system 100. In some embodiments, the server 110 may be directly connected to or communicate with one or more components (e.g., the terminal device 130, the storage device 140, and/or the image acquisition device 120) of the image processing system 100.

The image acquisition device 120 may be configured to acquire one or more images. As used herein, an image may be a still image, a video, a stream video, or a video frame obtained from a video. The image may be a three-dimensional (3D) image or a two-dimensional (2D) image. In some embodiments, the image acquisition device 120 may include a spherical camera, a hemispherical camera, a rifle camera, etc. In some embodiments, the image acquisition device 120 may include a black-white camera, a color camera, an infrared camera, an X-ray camera, etc. In some embodiments, the image acquisition device 120 may include a digital camera, an analog camera, etc. In some embodiments, the image acquisition device 120 may include a monocular camera, a binocular camera, a multi-camera, etc.

In some embodiments, the images may be processed by the image acquisition device 120 directly. In some embodiments, the image acquisition device 120 may transmit the captured images to any component (e.g., the server 110, the terminal device 130, the storage device 140) of the image processing system 100 via the network 150 for processing.

In some embodiments, the terminal devices 130 may include a mobile device 130-1, a tablet computer 130-2, a laptop computer 130-3, a telephone 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

The storage device 140 may store data and/or instructions. In some embodiments, the storage device 140 may store data obtained from the terminal device 130, the image acquisition device 120, the processing engine 112, and/or an external storage device. For example, the storage device 140 may store an image obtained from the image acquisition device 120. As another example, the storage device 140 may store one or more brightness parameters determined by the processing engine 112. As still another example, the storage device 140 may store an image processing algorithm including at least one image processing parameter. As still another example, the storage device 140 may store a value of at least one image processing parameter determined by the processing engine 112. As still another example, the storage device 140 may store a target image generated by the processing engine 112. In some embodiments, the storage device 140 may store data and/or instructions that the server 110 may execute or use to perform exemplary methods described in the present disclosure. For example, the storage device 140 may store instructions that the processing engine 112 may execute or use to determine at least one brightness parameter based on brightness values of a plurality of pixels in an image. As another example, the storage device 140 may store instructions that the processing engine 112 may execute or use to determine a value of at least one image processing parameter based on at least one brightness parameter. As another example, the storage device 140 may store instructions that the processing engine 112 may execute or use to generate a target image by processing an image according to an image processing algorithm upon a value of at least one image processing parameter.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components (e.g., the server 110, the terminal device 130, and/or the image acquisition device 120) of the image processing system 100. One or more components of the image processing system 100 may access the data or instructions stored in the storage device 140 via the network 150. In some embodiments, the storage device 140 may be directly connected to or communicate with one or more components (e.g., the server 110, the terminal device 130, and/or the image acquisition device 120) of the image processing system 100. In some embodiments, the storage device 140 may be part of the server 110.

The network 150 may facilitate exchange of information and/or data. In some embodiments, one or more components (e.g., the server 110, the terminal device 130, the storage device 140, or the image acquisition device 120) of the image processing system 100 may send information and/or data to other component(s) of the image processing system 100 via the network 150. For example, the server 110 may obtain/acquire one or more images from one or more image acquisition devices 120 (e.g., a camera). As another example, the server 110 may obtain an image processing algorithm from the storage device 140. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points (e.g., 150-1, 150-2), through which one or more components of the image processing system 100 may be connected to the network 150 to exchange data and/or information.

It should be noted that the image processing system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the image processing system 100 may further include a database, an information source, etc. As another example, the image processing system 100 may be implemented on other devices to realize similar or different functions.

Figure 2:
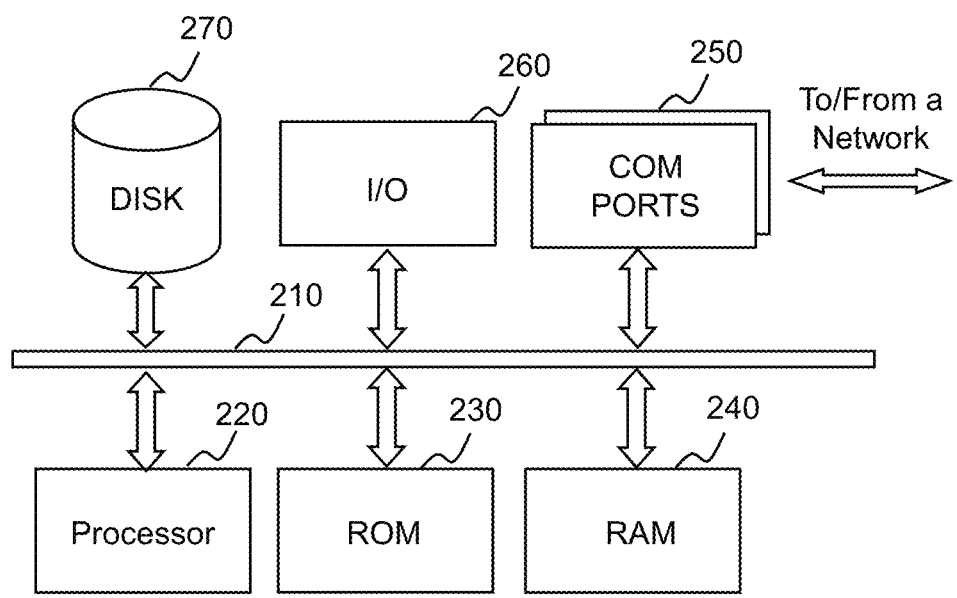
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110, the terminal device 130 may be implemented on the computing device 200. For example, the processing engine 112 may be implemented on the computing device 200 and configured to perform functions of the processing engine 112 disclosed in this disclosure.

The computing device 200 may be used to implement any component of the image processing system 100 as described herein. For example, the processing engine 112 may be implemented on the computing device 200, via its hardware, software program, firmware, or a combination thereof. Although only one such computer is shown, for convenience, the computer functions relating to the image processing as described herein may be implemented in a distributed fashion on a number of similar platforms to distribute the processing load.

The computing device 200 may include COM ports 250 connected to and from a network connected thereto to facilitate data communications. The computing device 200 may also include a processor 220, in the form of one or more, e.g., logic circuits, for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read only memory (ROM) 230, or a random access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is described in FIG. 2. Multiple processors are also contemplated, thus operations and/or steps performed by one processor as described in the present disclosure may also be jointly or separately performed by the multiple processors. For example, if in the present disclosure the processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
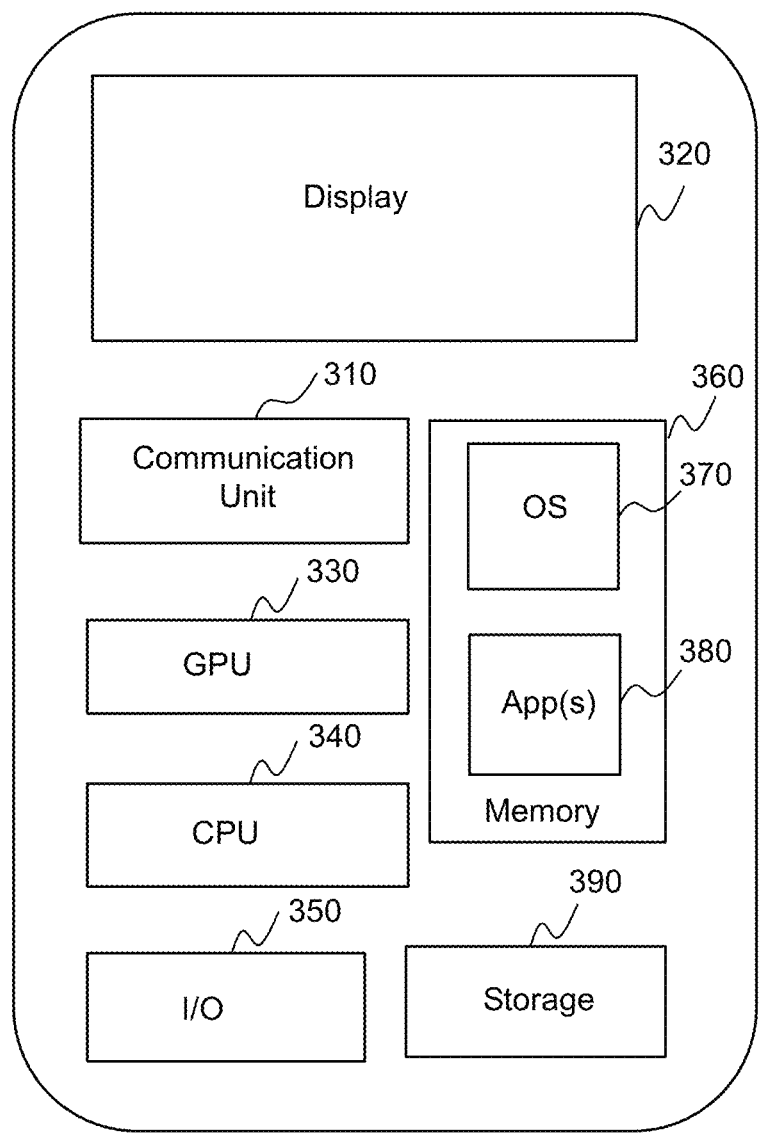
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device according to some embodiments of the present disclosure. In some embodiments, the terminal device 130 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile app for receiving and rendering information relating to image processing or other information from the image processing system 100. User interactions with the information stream may be achieved via the I/O 350 and provided to the processing engine 112 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
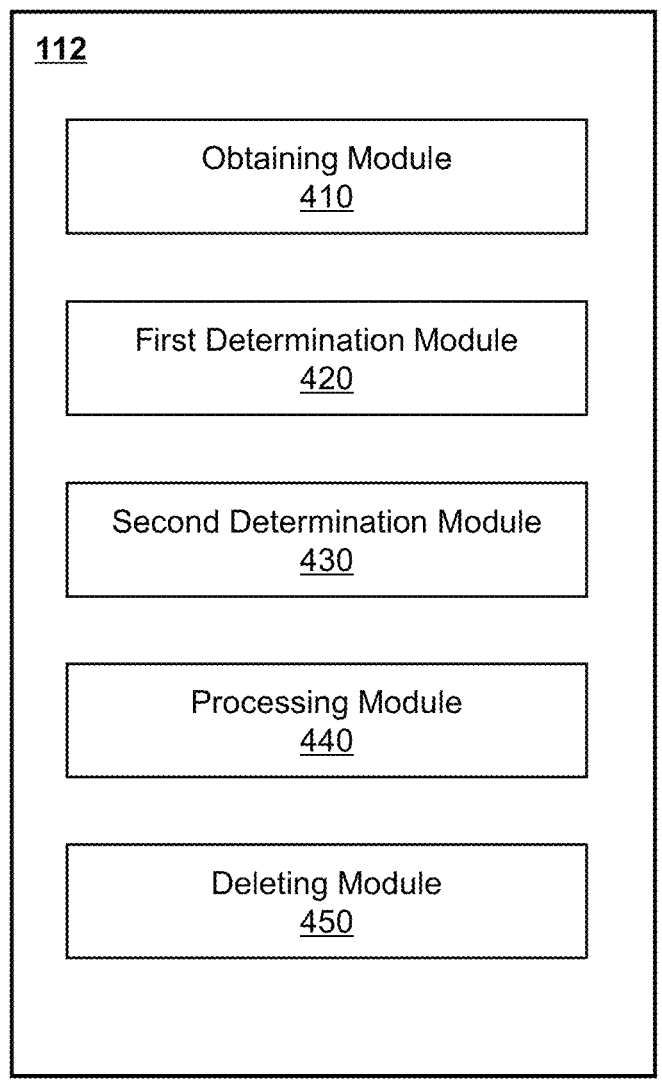
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an obtaining module 410, a first determination module 420, a second determination module 430, a processing module 440, and a deleting module 450.

The obtaining module 410 may be configured to obtain data and/or information associated with the image processing system 100. For example, the obtaining module 410 may obtain an image including a plurality of pixels. As another example, the obtaining module 410 may obtain an image processing algorithm including at least one image processing parameter. The obtaining module 410 may obtain the data and/or information associated with the image processing system 100 form one or more components (e.g., the storage device 140, the image acquisition device 120, the terminal device 130) of the image processing system 100 or an external storage device via the network 150.

The first determination module 420 may be configured to determine a brightness parameter associated with an image. In some embodiments, the brightness parameter may include a brightness difference between two or more brightness values (e.g., a maximum brightness value and a minimum brightness value among brightness values of a plurality of pixels, an average brightness value), a variance of brightness values of a plurality of pixels, or the like, or any combination thereof. In some embodiments, the first determination module 420 may determine at least one brightness parameter associated with an image based on brightness values of a plurality of pixels in the image.

The second determination module 430 may be configured to determine an image processing parameter. In some embodiments, the image processing parameter may include an image enhancement parameter, an image denoising parameter, or the like, or any combination thereof. The image enhancement parameter may include an automatic gain control parameter, a low pass filter parameter, a high frequency enhancement parameter, a first weight of a histogram equalization processing, a second weight of an automatic gain control processing, or the like, or any combination thereof. In some embodiments, the second determination module 430 may determine a value of at least one image processing parameter based on at least one brightness parameter associated with an image.

The processing module 440 may be configured to generate a target image. In some embodiments, the processing module 440 may include a low-pass filter unit 810, an automatic gain control unit 820, a platform histogram equalization unit 830, and a high frequency enhancement unit

840. More descriptions of the processing module 440 may be found elsewhere in the present disclosure (e.g., FIG. 8 and descriptions thereof).

The deleting module 450 may be configured to delete one or more pixels in an image. For example, the deleting module 450 may determine a ranking of a plurality of pixels based on brightness values of the plurality of pixels in an image. The deleting module 450 may delete a first count of pixels (e.g., top 10, top 15, top 20, top 30, top 60, top 1%, top 5%, top 10%, top 20%) from the plurality of pixels based on the ranking of the plurality of pixels. The deleting module 450 may delete a second count of pixels (e.g., last 10, last 15, last 20, last 30, last 60, last 1%, last 5%, last 10%, last 20%) from the plurality of pixels based on the ranking of the plurality of pixels.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, one or more modules may be combined into a single module. For example, the first determination module 420 and the second determination module 430 may be combined as a single module which may both determine a brightness parameter and determine an image processing parameter. In some embodiments, one or more modules may be added. For example, the processing engine 112 may further include a storage module (not shown) used to store information and/or data (e.g., an image, a brightness parameter, an image processing parameter) associated with the image processing system 100. As another example, the processing engine 112 may further include a scene determination module (not shown) used to determine a scene associated with an image. In some embodiments, one or more modules may be omitted. For example, the obtaining module 410 may be omitted. As another example, the deleting module 450 may be omitted.

Figure 5:
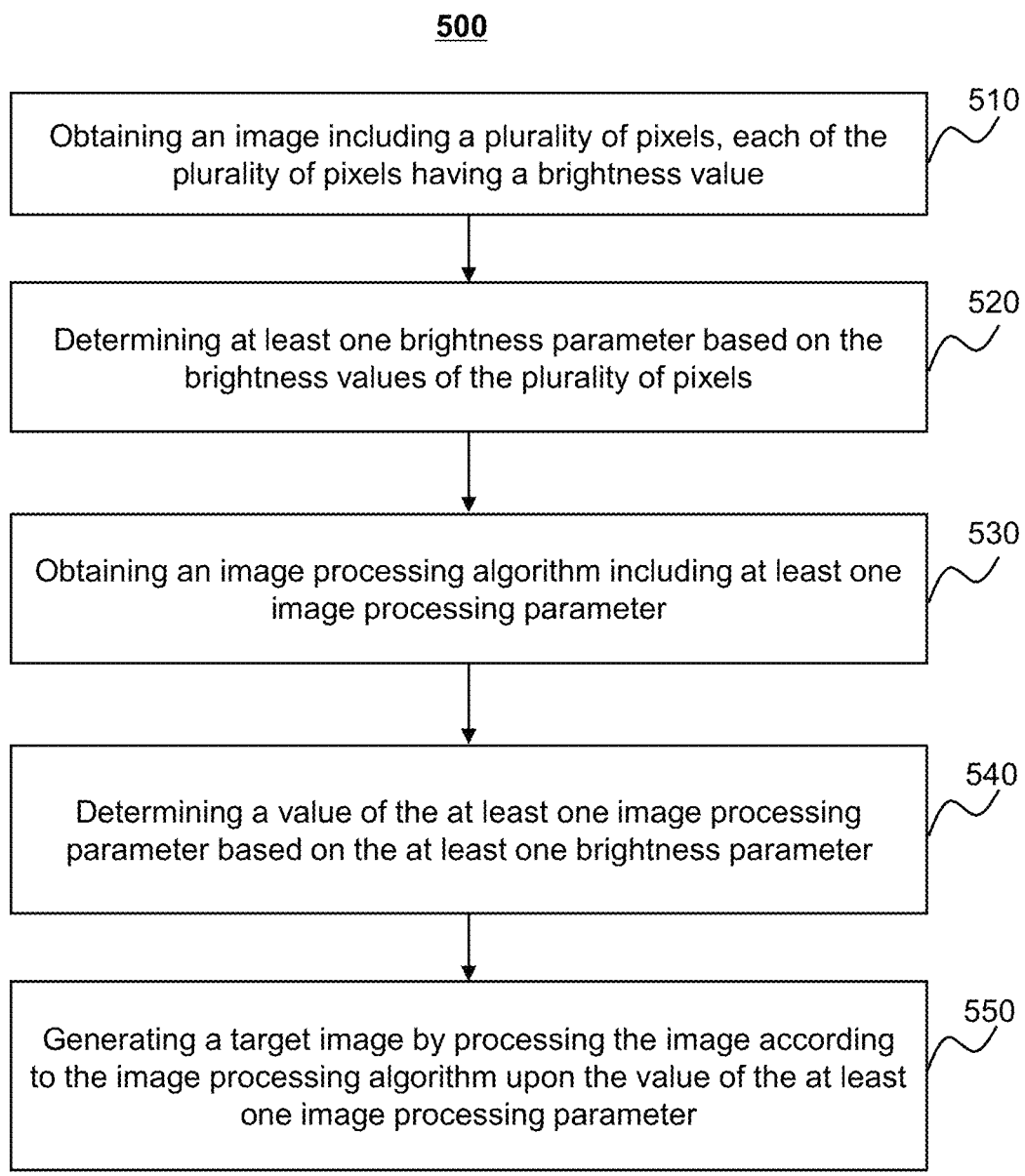
FIG. 5 is a flowchart illustrating an exemplary process for image processing according to some embodiments of the present disclosure.

FIG. 5 is a flowchart illustrating an exemplary process for image processing according to some embodiments of the present disclosure. The process 500 may be executed by the image processing system 100. For example, the process 500 may be implemented as a set of instructions stored in the storage 220. The processor 210 and/or the modules in FIG. 4 may execute the set of instructions, and when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 as illustrated in FIG. 5 and described below is not intended to be limiting.

The image processing method described in the present disclosure may be applied to an electronic device. The electronic device may be a terminal device (e.g., the terminal device 130), an image acquisition device (e.g., the image acquisition device 120), or the like. In some embodiments, an image may be processed by an image acquisition device directly. In some embodiments, an image may be transmitted to a terminal device for further processing.

In 510, the processing engine 112 (e.g., the obtaining module 410) may obtain an image. In some embodiments, the processing engine 112 may obtain the image from one or more components (e.g., the image acquisition device 120, the terminal device 130, the storage device 140) of the image processing system 100 via the network 150.

In some embodiments, the image may be a two-dimensional image, a three-dimensional image, or the like. In some embodiments, the image may be a grayscale image, a color image, or the like. In some embodiments, the image may include a plurality of pixels. Each of the plurality of pixels may have a brightness value. As used herein, a brightness value of a pixel may refer to an overall lightness or darkness of the pixel. A higher brightness value may correspond to a higher overall lightness of the pixel.

For a grayscale image, a pixel value (also referred to as a gray value) is a single number that represents the brightness of the pixel. For example, the pixel value may be an 8-bit integer ranging from 0 to 255. In some embodiments, zero may represent black, and 255 may represent white. A greater pixel value may correspond to a greater brightness value.

For a color image, separate red, green and blue components may be specified for each pixel (e.g., an RGB color space), and the pixel value may be a vector of three numbers. Three different components may be stored as three separate grayscale images known as color planes (one for each of red, green and blue), which may be recombined for displaying or processing. In some embodiments, the processing engine 112 may convert the color image to a grayscale image, and determine the brightness value of each pixel in the color image according to the gray value of the corresponding pixel in the converted image. In some embodiments, the processing engine 112 may determine the brightness value of the pixel in the color image based on an R value, a G value and a B value of the pixel in the color image. For example, the processing engine 112 may determine a sum of the R, G, and B values of the pixel in the image. A greater sum of the R, G, and B values may correspond to a greater brightness value.

In 520, the processing engine 112 (e.g., the first determination module 420) may determine at least one brightness parameter based on the brightness values of the plurality of pixels.

In some embodiments, the brightness parameter may include a brightness difference between two or more brightness values (e.g., a maximum brightness value, a minimum brightness value, an average brightness value) among the brightness values of the plurality of pixels, a variance of the brightness values of the plurality of pixels, or the like, or any combination thereof. The average brightness value may be an arithmetic mean of the brightness values of the plurality of pixels in the image.

In some embodiments, the brightness value of a pixel may reflect a thermal radiation of the object that corresponds to the pixel. The thermal radiation of the object may be related to a temperature of the object. The brightness difference (also referred to as a dynamic range of the image) may reflect a temperature difference (e.g., a thermal radiation difference) between two or more temperatures (e.g., thermal radiations) (e.g., the highest temperature and the lowest temperature) (e.g., the highest thermal radiation and the lowest thermal radiation) among temperatures (e.g., thermal radiations) of a plurality of objects present in the image. A greater brightness difference (i.e., a larger dynamic range) may correspond to a greater temperature difference (e.g., thermal radiation difference) in the image.

In some embodiments, the processing engine 112 may determine the brightness difference based on the maximum brightness value, the minimum brightness value among the brightness values of the plurality of pixels, and/or an average brightness value. For example, the processing engine 112 may determine the brightness difference by subtracting the minimum brightness value from the maximum brightness value. As another example, the processing engine 112 may determine the brightness difference by subtracting the minimum brightness value from an average brightness value. As still another example, the processing engine 112 may determine the brightness difference by subtracting the average brightness value from the maximum brightness value. As still another example, the processing engine 112 may determine a ratio between the minimum brightness value and the maximum brightness value as the brightness difference. As still another example, the processing engine 112 may determine a ratio between the minimum brightness (or the maximum brightness value) and the average brightness value as the brightness difference.

The variance of the brightness values may be a measurement of the distribution of the brightness values of the plurality of pixels in the image. The variance of the brightness values may indicate, for example, the differences between each brightness value and an average brightness value of the plurality of pixels. In some embodiments, the variance of the brightness values may reflect a richness degree of temperature levels of a plurality of objects present in the image. A larger variance of the brightness values may correspond to a richer degree of temperature levels of the objects in the image.

In some embodiments, the processing engine 112 may determine the variance of brightness values based on the brightness values of the plurality of pixels in the image. For example, the processing engine 112 may determine a difference value for each pixel of the plurality of pixels by subtracting the brightness value of the each pixel from the average brightness value. The average brightness value may be an arithmetic mean of the brightness values of the plurality of pixels in the image. The processing engine 112 may determine a sum of a square number of the difference value for the each pixel of the plurality of pixels in the image. The processing engine 112 may determine the variance of brightness values by dividing the sum of the square number of the difference value for the each pixel by the total number of the pixels in the image.

In 530, the processing engine 112 (e.g., the obtaining module 410) may obtain an image processing algorithm.

In some embodiments, the image processing algorithms may include an image enhancement algorithm, an image denoising algorithm, an image segmentation algorithm, an image compression algorithm, an image classification algorithm, or the like, or any combination thereof.

In some embodiments, the image processing algorithm may include at least one image processing parameter. The image processing parameters may include an image enhancement parameter, an image denoising parameter, an image segmentation parameter, an image compression parameter, an image classification parameter, or the like, or any combination thereof. The image enhancement parameters may include an automatic gain control parameter, a low pass filter parameter, a high frequency enhancement parameter, a first weight of a histogram equalization processing, a second weight of an automatic gain control processing, or the like, or any combination thereof. In some embodiments, a sum of the first weight of the histogram equalization processing and the second weight of the automatic gain control processing may be 1. More descriptions of the enhancement parameters may be found elsewhere in the present disclosure (e.g., FIG. 6 and descriptions thereof).

In some embodiments, a plurality of image processing algorithms may be stored in a storage device (e.g., the storage device 140) of the image processing system 100 or an external storage device. The processing engine 112 may access the storage device and retrieve the image processing algorithm from the plurality of image processing algorithms based on the purpose of image processing.

In 540, the processing engine 112 (e.g., the second determination module 430) may determine a value of the at least one image processing parameter based on the at least one brightness parameter.

In some embodiments, the processing engine 112 may determine a scene associated with the image based on the at least one brightness parameter (e.g., the brightness difference, the variance of the brightness values). In some embodiments, the scene associated with the image may include a low dynamic scene, a uniform scene with a high temperature object, a scene with a small temperature difference, a high dynamic scene, or the like, or any combination thereof.

As used herein, "a low dynamic scene" may refer to that brightness values of a plurality of pixels in an image are relatively uniform and a temperature difference (i.e., a thermal radiation difference) between the highest temperature (i.e., the highest thermal radiation) and the lowest temperature (i.e., the lowest thermal radiation) among temperatures (i.e., thermal radiations) of a plurality of objects present in the image is relatively small. In some embodiments, a relatively small brightness difference and a relatively small variance of the brightness values may indicate that the scene associated with the image is a low dynamic scene. As used herein, "a temperature difference between a first temperature and a second temperature is relatively small" may refer to that the temperature difference is less than a first temperature threshold, or a ratio between the temperature difference and the second temperature (or the first temperature) is less than a second temperature threshold (e.g., 0.05, 0.1, 0.2, 0.3). Similarly, "a relatively small brightness difference (or a relatively small variance of the brightness values)" may refer to that the brightness difference (or the variance of the brightness values) is less than a brightness difference threshold (or a variance threshold).

As used herein, "a uniform scene with a high temperature object" may refer to that brightness values of a plurality of pixels in an image are relatively uniform and an object with a relatively high temperature (i.e., a relatively high thermal radiation) is preset in the image. In some embodiments, a relatively large brightness difference and a relatively small variance of the brightness values may indicate that the scene associated with the image is a uniform scene with a high temperature object. As used herein, "a relatively large brightness difference" may refer to that the brightness difference is greater than a brightness difference threshold.

As used herein, "a high dynamic scene" may refer to that a temperature difference (i.e., a thermal radiation difference) between the highest temperature (i.e., the highest thermal radiation) and the lowest temperature (i.e., the lowest thermal radiation) among temperatures (i.e., thermal radiations) of a plurality of objects present in the image is relatively large, and a richness degree of temperature levels of the plurality of objects present in the image is relatively large. In some embodiments, a relatively large brightness difference and a relatively large variance of the brightness values may indicate that the scene associated with the image is a high dynamic scene. As used herein, "a relatively large variance of the brightness values" may refer to that the variance of the brightness values is greater than a variance threshold.

As used herein, "a scene with a small temperature difference" may refer to that a temperature difference (i.e., a thermal radiation difference) between the highest temperature (i.e., the highest thermal radiation) and the lowest temperature (i.e., the lowest thermal radiation) among temperatures (i.e., thermal radiations) of a plurality of objects present in the image is relatively small, and a richness degree of temperature levels of the plurality of objects present in the image is relatively large. In some embodiments, a relatively small brightness difference and a relatively large variance of the brightness values may indicate that the scene associated with the image is a scene with a small temperature difference. As used herein, "a richness degree of temperature levels of the plurality of objects present in the image is relatively large" may refer to that the richness degree of temperature levels of the plurality of objects present in the image is larger than a richness degree threshold.

In some embodiments, the processing engine 112 may determine the value of the at least one image processing parameter based on the scene associated with the image. In some embodiments, each scene may correspond to a value of the at least one image processing parameter. The processing engine 112 may determine the value of the at least one image processing parameter corresponding to the scene associated with the image as the value of the at least one image processing parameter. In some embodiments, the processing engine 112 may adjust a preset value of the at least one image processing parameter based on the scene associated with the image to, for example, improve the brightness of the image (e.g., amplifying the brightness values of the image), suppress noise in an image, or enhance details in an image. For example, for an image with the low dynamic scene, the processing engine 112 may determine the value of the at least one image processing parameter by multiplying the preset value of the at least one image processing parameter by a coefficient (e.g., a coefficient greater than 1), to ensure that the overall brightness of the image can be improved.

In some embodiments, the processing engine 112 may determine the value of the image processing parameter based on a preset relationship between the at least one brightness parameter and the image processing parameter. For example, the processing engine 112 may determine the value of the image processing parameter based on a preset relationship between the brightness difference and the image processing parameter and/or a preset relationship between the variance of the brightness values and the image processing parameter. The preset relationship between the brightness difference and the image processing parameter and/or the preset relationship between the variance of the brightness values and the image processing parameter may be set manually by a user, or determined by one or more components of the image processing system 100.

For example, a smaller brightness difference may correspond to a larger automatic gain control parameter. A relatively large automatic gain control parameter may be used to ensure that the overall brightness of an image with a low dynamic scene can be improved. As another example, a smaller variance of the brightness values may correspond to a smaller low pass filter parameter and/or a smaller high frequency enhancement parameter. A relatively small low pass filter parameter and/or a relatively small high frequency enhancement parameters may be used to ensure that noise in an image with a low dynamic scene is suppressed. A relatively large low pass filter parameter and/or a relatively large high frequency enhancement parameter may be used to ensure that details in an image with a high dynamic scene are enhanced. As still another example, a smaller variance of the brightness values may correspond to a smaller first weight of the histogram equalization processing and a larger second weight of the automatic gain control processing. A relatively small first weight of the histogram equalization processing and a relatively large second weight of the automatic gain control processing may be used to ensure that noise in an image with a low dynamic scene is suppressed. A relatively large first weight of the histogram equalization processing and a relatively small second weight of the automatic gain control processing may be used to ensure that details in an image with a high dynamic scene are enhanced. As used herein, "a relatively small image processing parameter" may refer to that the image processing parameter is less than a first threshold, and "a relatively large image processing parameter" may refer to that the image processing parameter is greater than a second threshold.

In some embodiments, a specific value of the brightness parameter may correspond to a specific value of the image processing parameter. The processing engine 112 may determine the value of the image processing parameter based on the value of the brightness parameter. In some embodiments, a specific range of values of the brightness parameter may correspond to a specific value of the image processing parameter. For example, after a value of the brightness parameter is determined, the processing engine 112 may determine a range of values of the brightness parameter to which the value of the brightness parameter belongs. The processing engine 112 may then determine a value of the image processing parameter corresponding to the range of values of the brightness parameter as a value of the image processing parameter corresponding to the value of the brightness parameter.

In some embodiments, a value of the brightness parameter and a value of the image processing parameter may have a linear relationship (e.g., a multi-segment linear relationship). Taking the linear relationship between the brightness difference and the automatic gain control parameter as an example, the processing engine 112 may segment brightness differences into three sections. The processing engine 112 may determine a linear correlation coefficient between each section of the brightness differences and values of the automatic gain control parameter, for example, K1, K2, and K3, respectively. Taking the linear relationship between the variances of the brightness values and the low pass filter parameter as an example, the processing engine 112 may segment variances of the brightness values into four sections. The processing engine 112 may determine a linear correlation coefficient between each section of the variances of the brightness values and values of the low pass filter parameter, for example, M1, M2, M3, and M4, respectively.

In some embodiments, a plurality of preset relationships between the at least one brightness parameter and the image processing parameter may be stored in a storage device (e.g., the storage device 140) of the image processing system 100 or an external storage device. The processing engine 112 may access the storage device and retrieve corresponding one or more image processing parameters based on the at least one brightness parameter associated with the image.

In 550, the processing engine 112 (e.g., the processing module 440) may generate a target image by processing the image according to the image processing algorithm upon the value of the at least one image processing parameter.

In some embodiments, the at least one image processing parameter may include multiple image processing parameters as described above. The processing engine 112 may generate the target image by processing the image based on the multiple image processing parameters according to a hierarchical processing algorithm. For example, the processing engine 112 may determine a low frequency component (e.g., a low frequency image) and a high frequency component (e.g., a high frequency image) of the image by performing a low-pass filtering processing on the image based on a low pass filter parameter. Then, the processing engine 112 may determine an enhanced low frequency component by performing a weighted automatic gain processing based on an automatic gain control parameter, and a weighted histogram equalization processing on the low frequency component of the image. The processing engine 112 may determine an enhanced high frequency component by performing an image enhancement processing on the high frequency component of the image based on a high frequency enhancement parameter. For example, a degree of enhancement of the high frequency component associated with a flat area in the image may be weakened, and a degree of enhancement of the high frequency component associated with an area with rich details may be strengthened. The processing engine 112 may determine the target image by summing the enhanced low frequency component and the enhanced high frequency component of the image. More descriptions of the generation of the target image may be found elsewhere in the present disclosure (e.g., FIG. 6 and descriptions thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, operation 530 may be performed before operation 510 or operation 520. In some embodiments, operation 530 may be omitted. In some embodiments, an operation for deleting one or more pixels in the image may be added after operation 510. In some embodiments, the plurality of pixels in the image may include one or more abnormal pixels generated due to an environment interference. After the image is obtained, the processing engine 112 (e.g., the deleting module 450) may delete the one or more abnormal pixels from the plurality of pixels in the image. In some embodiments, the processing engine 112 may determine a ranking of the plurality of pixels based on the brightness values of the plurality of pixels in the image. In some embodiments, the processing engine 112 may delete the first count of pixels from the plurality of pixels based on the ranking of the plurality of pixels. For example, the processing engine 112 may rank the plurality of pixels based on the brightness values of the plurality of pixels in the image in a descending order. The processing engine 112 may delete the first count of pixels (e.g., top 10, top 15, top 20, top 30, top 60, top 1%, top 5%, top 10%, top 20%) from the plurality of pixels based on the ranking of the plurality of pixels.

In some embodiments, the processing engine 112 may delete a second count of pixels (e.g., last 10, last 15, last 20, last 30, last 60, last 1%, last 5%, last 10%, last 20%) from the plurality of pixels based on the ranking of the plurality of pixels.

After the first count of pixels and the second count of pixels are deleted, the processing engine 112 may determine the at least one brightness parameter (e.g., the brightness difference, the variance of the brightness values) based on brightness values of the remaining pixels in the image. Therefore, the accuracy of the determination of the at least one brightness parameter may be improved, and accordingly the accuracy of the determination of the image processing parameter may also be improved.

FIG. 6 is a flowchart illustrating an exemplary process for generating a target image according to some embodiments of the present disclosure. The process 600 may be executed by the image processing system 100. For example, the process 600 may be implemented as a set of instructions stored in the storage 220. The processor 210 and/or the modules in FIG. 4 may execute the set of instructions, and when executing the instructions, the processor 210 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of the process 600 as illustrated in FIG. 6 and described below is not intended to be limiting.

In 610, the processing engine 112 (e.g., the processing module 440) may determine a low frequency image by performing a low-pass filtering processing on an image based on a low pass filter parameter.

The low-pass filtering processing may retain a low frequency component within the image while reducing a high frequency component in the image. As used herein, a low frequency component in an image may refer to pixel values that are changing slowly over space, and a high frequency component may refer to pixel values that are rapidly changing in space. After the low-pass filtering processing is performed on the image, a noise associated with a sharp transition of the pixel values may be reduced in the low frequency image.

In some embodiments, the processing engine 112 may perform the low-pass filtering processing by a low-pass filter based on the low pass filter parameter. The low pass filter parameter may be characterized by, for example, a cut-off frequency, an intensity of the low pass filter, or the like. The low-pass filter may pass low-frequency signals and attenuates signals with frequencies higher than the cut-off frequency. In some embodiments, the low-pass filters may include an ideal low-pass filter, a Butterworth low-pass filter, a Gaussian low-pass filter, or the like, or any combination thereof. In some embodiments, the value(s) of the low pass filter parameter (e.g., the value of the cut-off frequency, the value of the intensity of the low pass filter) may be determined according to, for example, the operation of 540. Specifically, the value(s) of the low pass filter parameter may relate to the scene associated with the image that corresponds to the at least one brightness parameter of the image.

In 620, the processing engine 112 (e.g., the processing module 440) may determine a high frequency image based on the image and the low frequency image.

In some embodiments, the processing engine 112 may determine the high frequency image by subtracting a brightness value of each second pixel in the low frequency image from a brightness value of each corresponding pixel in the image. Compared with the image, the high frequency image may appear sharper, with more details being showed.

In 630, the processing engine 112 (e.g., the processing module 440) may determine a second image by performing an automatic gain processing on the low frequency image based on an automatic gain control parameter.

The automatic gain processing may be a technique based on linear mapping. The automatic gain processing may remove extreme values (e.g., 2% minimum and maximum values among all the pixel values) and linearly maps remaining values onto an 8-bit domain for display. The automatic gain control parameter may be characterized by, for example, an average brightness, a stretch amplitude, or the like, or any combination thereof. As used herein, an average brightness may reflect an overall brightness of an image. A stretch amplitude may reflect a ratio between a range of pixel values in a processed image (e.g., the second image) and a range of pixel values in an original image (e.g., the low frequency image). In some embodiments, the value(s) of the automatic gain control parameter (e.g., the value of the average brightness, the value of the stretch amplitude) may be determined according to, for example, the operation of 540. Specifically, the value(s) of the automatic gain control parameter may relate to the scene associated with the image that corresponds to the at least one brightness parameter of the image.

In 640, the processing engine 112 (e.g., the processing module 440) may determine a third image by performing a histogram equalization processing on the low frequency image.

The histogram equalization processing may be a technique based on nonlinear mapping. The histogram equalization processing may normalize an intensity distribution of pixel values by using its cumulative distribution function to make an output image have a more uniform distribution of intensity.

In some embodiments, the processing engine 112 may perform the histogram equalization processing on the low frequency image according to a histogram equalization algorithm. Exemplary histogram equalization algorithms may include a platform histogram equalization, a histogram expansion, a local area histogram equalization (LAHE), a cumulative histogram equalization, a Par sectioning, an Odd sectioning, or the like.

In 650, the processing engine 112 (e.g., the processing module 440) may determine a fourth image by performing a high frequency enhancement processing on the high frequency image based on a high frequency enhancement parameter.

The high frequency enhancement processing may highlight edges and fine details in the high frequency image. The high frequency enhancement parameter may be characterized by, for example, a high frequency enhancement intensity, or the like. In some embodiments, the processing engine 112 may perform the high frequency enhancement processing (e.g., an adaptive high frequency enhancement processing) by a high-pass filter (e.g., a high frequency enhancement filter) based on the high frequency enhancement parameter. In some embodiments, the value(s) of the high frequency enhancement parameter (e.g., the value of the high frequency enhancement intensity) may be determined according to, for example, the operation of 540. Specifically, the value(s) of the high frequency enhancement parameter may relate to the scene associated with the image that corresponds to the at least one brightness parameter of the image.

In 660, the processing engine 112 (e.g., the processing module 440) may determine a fifth image by performing a weighted summation operation on the second image and the third image based on a first weight of the histogram equalization processing and a second weight of an automatic gain control processing.

The first weight of the histogram equalization processing (or the second weight of the automatic gain control processing) may reflect the importance of the histogram equalization processing (or the automatic gain control processing) in the determination of the fifth image and the target image. A relatively small first weight of the histogram equalization processing and a relatively large second weight of the automatic gain control processing may be used to ensure that noise in an image (e.g., the fifth image, the target image) is suppressed. A relatively large first weight of the histogram equalization processing and a relatively small second weight of the automatic gain control processing may be used to ensure that details in an image (e.g., the fifth image, the target image) are enhanced. In some embodiments, the first weight and the second weight may be determined according to, for example, the operation of 540. Specifically, the first weight and the second weight may relate to the scene associated with the image that corresponds to the at least one brightness parameter of the image. The processing engine 112 may determine the fifth image based on brightness values of pixels in the second image, brightness values of pixels in the third image, the first weight, and the second weight. For example, the processing engine 112 may multiple the brightness value of each pixel in the second image by the second weight. The processing engine 112 may multiple the brightness value of each pixel in the third image by the first weight. The processing engine 112 may determine the fifth image by summing the weighted brightness value of the each pixel in the second image and the weighted brightness value of the each pixel in the third image.

In some embodiments, the first weight and the second weight may be set manually by a user, or be determined by one or more components of the image processing system 100 according to default settings. In some embodiments, a sum of the first weight of the histogram equalization processing and the second weight of the automatic gain control processing may be 1.

In 670, the processing engine 112 (e.g., the processing module 440) may determine the target image based on the fourth image and the fifth image. In some embodiments, the processing engine 112 may determine the target image by summing a high frequency value of each third pixel in the fourth image and a brightness value of each corresponding fourth pixel in the fifth image.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
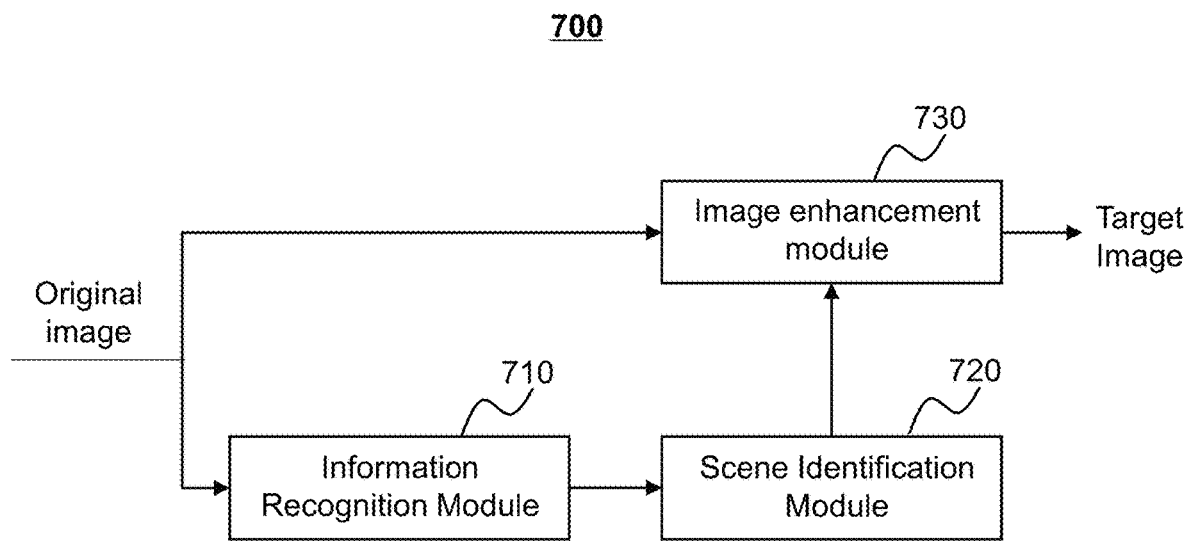
FIG. 7 is a schematic diagram illustrating an exemplary image processing system according to some embodiments of the present disclosure.

FIG. 7 is a schematic diagram illustrating an exemplary image processing system according to some embodiments of the present disclosure. The image processing system 700 may include an information recognition module 710, a scene identification module 720, and an image enhancement module 730.

The information recognition 710 may be configured to determine at least one brightness parameter associated with an original image. The at least one brightness parameter may include a brightness difference between two or more brightness values (e.g., a maximum brightness value and a minimum brightness value among brightness values of a plurality of pixels) in the original image, a variance of the brightness values of the plurality of pixels, or the like, or any combination thereof. In some embodiments, the information recognition module 710 may determine the at least one brightness parameter based on the brightness values of the plurality of pixels in the original image as described in connection with operation 520.

The scene identification module 720 may be configured to identify a scene associated with the original image. The scene associated with the original image may include a low dynamic scene, a uniform scene with a high temperature object, a scene with a small temperature difference, a high dynamic scene, or the like, or any combination thereof. In some embodiments, the scene identification module 720 may identify the scene associated with the original image based on the at least one brightness parameter associated with the original image as described in connection with operation 540. In some embodiments, the scene identification module 720 may determine a value of at least one image processing parameter based on the scene associated with the original image as described in connection with operation 540.

The image enhancement module 730 may be configured to generate a target image. In some embodiments, the image enhancement module 730 may generate the target image by processing the original image based on the value of the at least one image processing parameter as described in connection with operation 550.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be added in the image processing system 700. For example, an obtaining module (e.g., an obtaining module 410) and/or a deleting module (e.g., a deleting module 450) may be added in the image processing system 700.

Figure 8:
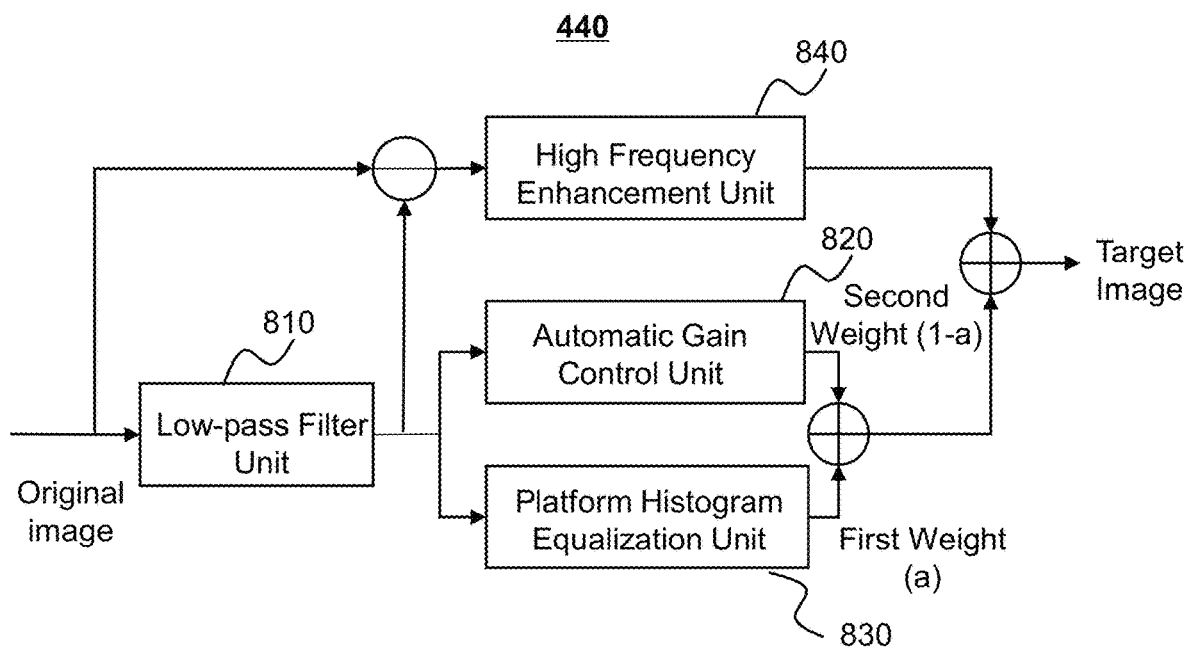
FIG. 8 is a schematic diagram illustrating an exemplary processing module according to some embodiments of the present disclosure.

FIG. 8 is a schematic diagram illustrating an exemplary processing module according to some embodiments of the present disclosure. The processing module 440 may include a low-pass filter unit 810, an automatic gain control unit 820, a platform histogram equalization unit 830, and a high frequency enhancement unit 840.

The low-pass filter unit 810 may be configured to perform a low-pass filter processing on an image. In some embodiments, the low-pass filter unit 810 may determine a low frequency image by performing a low-pass filter processing on an original image based on a low pass filter parameter (e.g., a low pass filter intensity). In some embodiments, the low-pass filter unit 810 may be an ideal low-pass filter, a Butterworth low-pass filter, a Gaussian low-pass filter, or the like, or any combination thereof.

The automatic gain control unit 820 may be configured to perform an automatic gain processing on an image. In some embodiments, the automatic gain control unit 820 may determine a second image by performing an automatic gain processing on the low frequency image generated by the low-pass filter unit 810 based on an automatic gain control parameter (e.g., an average brightness, a stretch amplitude).

The platform histogram equalization unit 830 may be configured to perform a platform histogram equalization processing on an image. In some embodiments, the platform histogram equalization unit 830 may determine a third image by performing a histogram equalization processing on the low frequency image generated by the low-pass filter unit 810.

The high frequency enhancement unit 840 may be configured to perform a high frequency enhancement processing on an image. In some embodiments, a high frequency image may be determined by performing a subtraction operation on the original image and the low frequency image. For example, the high frequency image may be determined by subtracting a brightness value of each second pixel in a low frequency image from a brightness value of each corresponding first pixel in an original image. The high frequency enhancement unit 840 may determine a fourth image by performing a high frequency enhancement processing on the high frequency image based on a high frequency enhancement parameter (e.g., a high frequency enhancement intensity). In some embodiments, the high frequency enhancement unit 840 may include a high frequency enhancement filter.

In some embodiments, a fifth image may be determined by performing a weighted summation operation on the second image and the third image based on a first weight (a) of the histogram equalization processing and a second weight (1-a) of an automatic gain control processing. A target image may be determined by performing a summation operation on the fourth image and the fifth image. For example, the target image may be determined by summing a high frequency value of each third pixel in the fourth image and a brightness value of each corresponding fourth pixel in the fifth image.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing implemented on a computing device having at least one processor and at least one storage device, the method comprising:
   obtaining an image including a plurality of pixels, each of the plurality of pixels having a brightness value;
   determining at least one brightness parameter based on the brightness values of the plurality of pixels, wherein the at least one brightness parameter includes at least one of a brightness difference between a maximum brightness value and a minimum brightness value among the brightness values of the plurality of pixels, or a variance of the brightness values of the plurality of pixels;
   obtaining an image processing algorithm including at least one image processing parameter, wherein the at least one image processing parameter includes at least one of an image enhancement parameter or an image denoising parameter, the image enhancement parameter includes at least one of an automatic gain control parameter, a low pass filter parameter, a high frequency enhancement parameter, a first weight of a histogram equalization processing, or a second weight of an automatic gain control processing, and a sum of the first weight of the histogram equalization processing and the second weight of the automatic gain control processing is 1;

determining a value of the at least one image processing parameter based on the at least one brightness parameter; and generating a target image by processing the image according to the image processing algorithm upon the value of the at least one image processing parameter.

2. The method of claim 1, wherein the determining a value of the at least one image processing parameter based on the at least one brightness parameter further comprises:

determining the value of the at least one image processing parameter based on at least one of a preset relationship between the brightness difference and the at least one image processing parameter, or a preset relationship between the variance of the brightness values and the at least one image processing parameter.

3. The method of claim 1, wherein the generating a target image by processing the image according to the image processing algorithm upon the value of the at least one image processing parameter further comprises:

generating the target image by processing the image based on the at least one image processing parameter according to a hierarchical processing algorithm.

4. The method of claim 3, wherein the generating the target image by processing the image based on the at least one image processing parameter according to a hierarchical processing algorithm comprises:

determining a low frequency image by performing a low-pass filtering processing on the image based on a low pass filter parameter;

determining a high frequency image by subtracting a brightness value of each second pixel of a plurality of second pixels in the low frequency image from the brightness value of the each pixel of the plurality of pixels in the image; and generating the target image based on the low frequency image and the high frequency image.

5. The method of claim 4, wherein the generating the target image based on the low frequency image and the high frequency image comprises:

determining a second image by performing an automatic gain processing on the low frequency image based on an automatic gain control parameter;

determining a third image by performing a histogram equalization processing on the low frequency image;

determining a fourth image by performing a high frequency enhancement processing on the high frequency image based on a high frequency enhancement parameter;

determining a fifth image by performing a weighted summation operation on the second image and the third image based on a first weight of the histogram equalization processing and a second weight of an automatic gain control processing; and determining the target image by performing a summation operation on the fourth image and the fifth image.

6. The method of claim 1, wherein the determining at least one brightness parameter based on the brightness values of the plurality of pixels comprises:

determining a ranking of the plurality of pixels based on the brightness values of the plurality of pixels in the image;

deleting a portion of pixels from the plurality of pixels based on the ranking of the plurality of pixels; and determining the at least one brightness parameter based on brightness values of remaining pixels in the image.

7. The method of claim 1, wherein the determining a value of the at least one image processing parameter based on the at least one brightness parameter comprises:

determining a scene associated with the image based on the at least one brightness parameter; and determining the value of the at least one image processing parameter based on the scene associated with the image.

8. The method of claim 7, wherein the scene associated with the image includes at least one of a low dynamic scene, a uniform scene with a high temperature object, a scene with a small temperature difference, or a high dynamic scene.

9. The method of claim 8, wherein the brightness difference less than a brightness difference threshold and the variance of the brightness values less than a variance threshold indicate that the scene associated with the image is the low dynamic scene;

the brightness difference greater than the brightness difference threshold and the variance of the brightness values less than the variance threshold indicate that the scene associated with the image is the uniform scene with a high temperature object;

the brightness difference greater than the brightness difference threshold and the variance of the brightness values greater than the variance threshold indicate that the scene associated with the image is the high dynamic scene; and the brightness difference less than the brightness difference threshold and the variance of the brightness values greater than the variance threshold indicate that the scene associated with the image is the scene with a small temperature difference.

10. The method of claim 3, wherein the generating the target image by processing the image based on the at least one image processing parameter according to a hierarchical processing algorithm comprises:

determining a low frequency component and a high frequency component of the image by performing a low-pass filtering processing on the image based on a low pass filter parameter;

determining an enhanced low frequency component by performing a weighted automatic gain processing based on an automatic gain control parameter and a weighted histogram equalization processing on the low frequency component of the image;

determining an enhanced high frequency component by performing an image enhancement processing on the high frequency component of the image based on a high frequency enhancement parameter; and determining the target image by summing the enhanced low frequency component and the enhanced high frequency component of the image.

11. A system for image processing, comprising:

at least one storage medium storing a set of instructions;

at least one processor in communication with the at least one storage medium, when executing the stored set of instructions, the at least one processor causes the system to:

obtain an image including a plurality of pixels, each of the plurality of pixels having a brightness value;

determine at least one brightness parameter based on the brightness values of the plurality of pixels, wherein the at least one brightness parameter includes at least one of a brightness difference between a maximum brightness value and a minimum brightness value among the brightness values of the plurality of pixels, or a variance of the brightness values of the plurality of pixels;

obtain an image processing algorithm including at least one image processing parameter, wherein the at least one image processing parameter includes at least one of an image enhancement parameter or an image denoising parameter, the image enhancement parameter includes at least one of an automatic gain control parameter, a low pass filter parameter, a high frequency enhancement parameter, a first weight of a histogram equalization processing, or a second weight of an automatic gain control processing, and a sum of the first weight of the histogram equalization processing and the second weight of the automatic gain control processing is 1;

determine a value of the at least one image processing parameter based on the at least one brightness parameter; and generate a target image by processing the image according to the image processing algorithm upon the value of the at least one image processing parameter.

12. The system of claim 11, wherein to determine a value of the at least one image processing parameter based on the at least one brightness parameter, the at least one processor causes the system to:

determine the value of the at least one image processing parameter based on at least one of a preset relationship between the brightness difference and the at least one image processing parameter, or a preset relationship between the variance of the brightness values and the at least one image processing parameter.

13. The system of claim 11, wherein to generate a target image by processing the image according to the image processing algorithm upon the value of the at least one image processing parameter, the at least one processor causes the system to:

generate the target image by processing the image based on the at least one image processing parameter according to a hierarchical processing algorithm.

14. A non-transitory computer readable medium storing instructions, the instructions, when executed by at least one processor, causing the at least one processor to implement a method comprising:

obtaining an image including a plurality of pixels, each of the plurality of pixels having a brightness value;

determining at least one brightness parameter based on the brightness values of the plurality of pixels, wherein the at least one brightness parameter includes at least one of a brightness difference between a maximum brightness value and a minimum brightness value among the brightness values of the plurality of pixels, or a variance of the brightness values of the plurality of pixels;

obtaining an image processing algorithm including at least one image processing parameter, wherein the at least one image processing parameter includes at least one of an image enhancement parameter or an image denoising parameter, the image enhancement parameter includes at least one of an automatic gain control parameter, a low pass filter parameter, a high frequency enhancement parameter, a first weight of a histogram equalization processing, or a second weight of an automatic gain control processing, and a sum of the first weight of the histogram equalization processing and the second weight of the automatic gain control processing is 1;

determining a value of the at least one image processing parameter based on the at least one brightness parameter; and generating a target image by processing the image according to the image processing algorithm upon the value of the at least one image processing parameter.

* * * * *